United States Patent
Gribetz et al.

(10) Patent No.: US 10,057,968 B2
(45) Date of Patent: Aug. 21, 2018

(54) WIDE FIELD OF VIEW HEAD MOUNTED DISPLAY APPARATUSES, METHODS AND SYSTEMS

(71) Applicant: Meta Company, Redwood City, CA (US)

(72) Inventors: Meron Gribetz, Belmont, CA (US); Ashish Ahuja, Mountain View, CA (US); Zhangyi Zhong, San Francisco, CA (US); Martin Hasek, Portola Valley, CA (US); Blaze Sanders, San Francisco, CA (US); Raymond Chung Hing Lo, Ontario, CA (US); Ben Sand-Schreiner-Morison, Ainslie (AU)

(73) Assignee: Meta Company, San Mateo, CA (US)

(*) Notice: Subject to any disclaimer, the term of this patent is extended or adjusted under 35 U.S.C. 154(b) by 0 days.

(21) Appl. No.: 14/945,372

(22) Filed: Nov. 18, 2015

(65) Prior Publication Data

US 2016/0139413 A1   May 19, 2016

Related U.S. Application Data

(60) Provisional application No. 62/081,561, filed on Nov. 18, 2014.

(51) Int. Cl.
  *G02B 27/01* (2006.01)
  *H05B 37/02* (2006.01)
  *G11B 27/10* (2006.01)

(52) U.S. Cl.
  CPC ..... *H05B 37/0281* (2013.01); *G02B 27/0172* (2013.01); *G11B 27/10* (2013.01); *G02B 2027/011* (2013.01); *G02B 2027/0178* (2013.01)

(58) Field of Classification Search
  CPC .. G02B 27/01; G02B 27/017; G02B 27/0101; G02B 27/0149; G02B 27/0103; G02B 27/0172; G02B 2027/013; G02B 2027/0123; G02B 2027/0194; G02B 2027/011; G02B 2027/0178; H05B 37/0281; G11B 27/10; G09G 3/003
  USPC ....... 359/13, 14, 631, 632, 633; 345/7, 8, 9; 348/115; 349/11
  See application file for complete search history.

(56) References Cited

U.S. PATENT DOCUMENTS

| | | | |
|---|---|---|---|
| 5,526,184 A | 6/1996 | Tokuhashi et al. | |
| 5,539,422 A | 7/1996 | Heacock et al. | |
| 7,567,385 B2 | 7/2009 | Yamazaki et al. | |
| 2007/0177275 A1* | 8/2007 | McGuire, Jr. .......... | G02B 17/08 359/630 |

(Continued)

FOREIGN PATENT DOCUMENTS

CN     203786390     8/2015

OTHER PUBLICATIONS

International Search Report, PCT/US15/061437, dated Jan. 28, 2016, 2 Pages.
Written Opinion, PCT/US15/061437, dated Jan. 28, 2016, 5 Pages.

*Primary Examiner* — Jie Lei
(74) *Attorney, Agent, or Firm* — Andrew Bodendorf

(57) ABSTRACT

In one general aspect, an optical system for a head mounted display system is provided. The optical system includes an image source and an optical component. The optical component includes a reflective surface configured to receive an image from the image source, the optical component having a specified curvature that reflects and presents the image to a user of the head mounted display.

28 Claims, 15 Drawing Sheets

(56) References Cited

U.S. PATENT DOCUMENTS

| | | |
|---|---|---|
| 2010/0002154 A1 | 1/2010 | Hua |
| 2012/0119978 A1 | 5/2012 | Border et al. |
| 2012/0212830 A1 | 8/2012 | Mewes et al. |
| 2013/0077175 A1* | 3/2013 | Hotta ................ G02B 3/08 359/630 |
| 2014/0152531 A1* | 6/2014 | Murray ............. G06F 1/1632 345/8 |

* cited by examiner

WIDE FIELD OF VIEW HEAD MOUNTED DISPLAY APPARATUSES, METHODS AND SYSTEMS

CROSS-REFERENCE TO RELATED APPLICATIONS

This application claims the benefit under 35 U.S.C. § 119(e) of U.S. Provisional Application No. 62/081,561, titled "HIGH FIELD OF VIEW HEAD MOUNTED DISPLAY APPARATUSES, METHODS AND SYSTEMS" filed on Nov. 18, 2014 in the U.S. Patent and Trademark Office, which is herein expressly incorporated by reference in its entirety for all purposes.

BACKGROUND

A head-mounted display (HMD) is a display device, worn on the head of a user, that has an opaque display optic positioned in front of one (monocular HMD) or each eye (binocular HMD) of the user. Alternatively, an optical HMD is a wearable device, also worn on the head of user that incorporates transparent optics that have the capability of relaying projected images to the viewer while allowing the viewer to see the exterior environment.

SUMMARY

Aspects of the disclosed apparatuses, methods and systems include an image source and an optical element that provide a wide field of view (FOV) for a head mounted display (HMD). The optical element may use a single reflective surface or a compound refractive/reflective surface.

In one aspect, a head mounted display (HMD) configured to be worn by a user includes: an image source including a two dimensional (2D) display surface positioned outside the direct field of view of a user of the HMD; and an optical component including: a first concave surface; a second concave surface; a partially reflective optical coating covering the first concave surface and the second concave surface; wherein light emitted from the 2-D display surface is reflected by the first and second concave surfaces as an image presented within the field of view of a user of the HMD.

The first concave surface may mirror the second concave surface through a plane that bisects and is orthogonal to a horizontal axis formed roughly between the locations of the center of the eyes of the user of an HMD.

The curvature of the first concave surface and the second concave surface may specify an optical power.

The curvature of the first concave surface and the second concave surface may be non-spherical. The curvature of the first concave surface and the second concave surface also may be biconic, biconic Zernike, or toroidal.

An optical axis of the first concave surface and the second concave surface may be titled with respect to the field of view of the user of the HMD.

The optical component may be a transparent visor attached to and supported by the HMD including: a first image region including the first concave surface; a second image region including the second concave surface; a bridge region formed between the first and second concave surfaces; and two temporal regions formed on either side of the first or second image regions.

The image source may include two 2-D display surfaces where a first 2-D display surface is positioned to illuminate the first concave surface and a second 2-D display surface is positioned to illuminate the second concave surface.

The 2-D display surface also may include a base edge and a far edge, wherein the base edge is positioned by the HMD in proximity to the forehead of user of the HMD and the plane formed by the two dimensional display surface is titled along an axis running along the base edge away from the first and second concave surfaces.

The maximum angle of reflection of light from the far edge of the image source reflected to an eye of the user by either the first or second concave surface may be approximately double the minimum angle of reflection of light reflected from the base edge to an eye of the user by either the first or second concave surface.

The maximum angle of reflection of light reflected from the far edge of the image source to an eye of the user by either the first or second concave surface may be less than 100 degrees and the minimum angle of reflection of light reflected to the eye of the user from the base edge by either the first or second concave surface may be greater than 40 degrees.

The HMD also may include a first compound refractive layer with the first concave surface embedded therein and a second compound refractive layer with the second concave surface embedded therein.

The partially reflective coating may be a series of thin films.

The image source may be one of a liquid crystal display (LCD), a Light Emitting Diode (LED) display, a flexible organic LED (OLED) display, or a Liquid Crystal on Silicon (LCoS or LCOS) display.

The image source also may be a display of a mobile device—such as, for example, a mobile phone that may be inserted or affixed to and subsequently detached from the HMD.

The first concave surface may be positioned to reflect light from the image source to a first eye of the user and the second concave surface may be positioned to reflect light from the image source to a second eye of the user.

In another general aspect, a head mounted display (HMD) configured to be worn by a user comprising: an optical component including: a first concave surface; a second concave surface; a partially reflective optical coating covering the first concave surface and the second concave surface; wherein the first concave and the second concave surface are positioned by the optical component to reflect light emitted from a 2-D display surface outside the direct field of view of a user of the HMD as an image presented within the field of view of a user of the HMD.

The HMD may further include an image source including the two dimensional (2D) display surface, wherein the HMD positions the image source outside the direct field of view of a user of the HMD.

The HMD may further include an opening in the HMD configured to detachably hold and position an image source including the two dimensional (2D) display surface outside the direct field of view of a user of the HMD, such as the mobile device mentioned above.

The details of various embodiments are set forth in the accompanying drawings and the description below. Other features and advantages will be apparent from the following description, the drawings, and the claims.

BRIEF DESCRIPTION OF DRAWINGS

The following description illustrates aspects of the disclosed apparatuses, methods and systems in more detail, by way of examples which are intended to be non-limiting and illustrative with reference to the accompanying drawings, in which.

DETAILED DESCRIPTION

Figure 1:
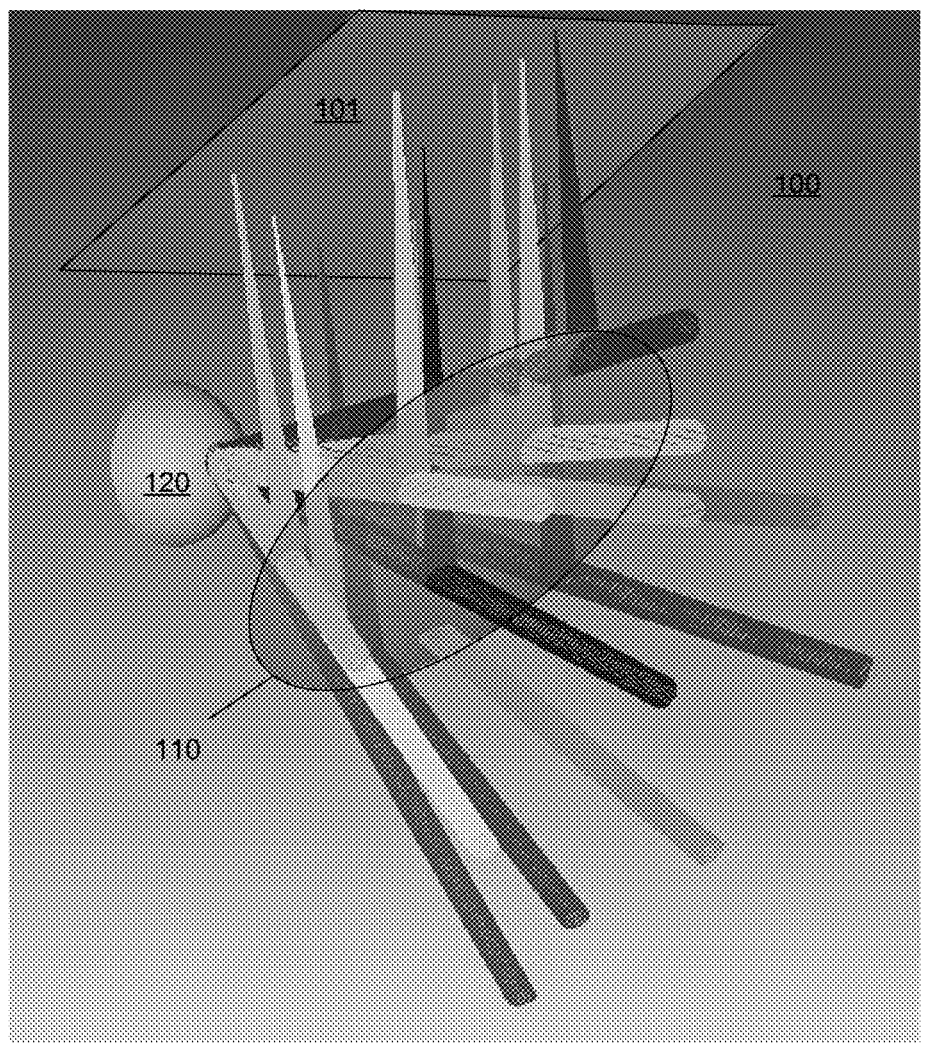
FIG. 1 illustrates an example of elements of an optical system.

The following detailed description is merely exemplary in nature and is not intended to limit the described embodiments (examples, options, etc.) or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable making or using the embodiments of the disclosure and are not intended to limit the scope of the disclosure. For purposes of the description herein, the terms "upper," "lower," "left," "rear," "right," "front," "vertical," "horizontal," and derivatives thereof shall relate to the examples as oriented in the drawings. Furthermore, there is no intention to be bound by any expressed or implied theory presented in the preceding technical field, background, brief summary or the following detailed description. It is also to be understood that the specific devices and processes illustrated in the attached drawings, and described in the following specification, are exemplary embodiments (examples), aspects and/or concepts. Hence, specific dimensions and other physical characteristics relating to the embodiments disclosed herein are not to be considered as limiting, except in the context of any claims which expressly state otherwise. It is understood that "at least one" is equivalent to "a". The aspects (examples, alterations, modifications, options, variations, embodiments and any equivalent thereof) are described with reference to the drawings; it should be understood that the descriptions herein show by way of illustration various embodiments in which claimed inventions may be practiced and are not exhaustive or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further alternate embodiments which are not described may be available for a portion is not to be considered a disclaimer of those alternate embodiments. It will be appreciated that many of those embodiments not described incorporate the same principles of the invention and others are equivalent. Thus, it is to be understood that other embodiments may be utilized and functional, logical, organizational, structural and/or topological modifications may be made without departing from the scope and/or spirit of the disclosure.

HMDs can display a computer generated image (CGI), live images from the real world, or a combination of both. In some implementations, an HMD may display only a CGI, sometimes referred to as a virtual image. In other implementations, an HMD may allow a CGI to be superimposed on a real-world view, which may be referred to as augmented or mixed reality. Combining a real-world view with CGI may be accomplished, for example, by projecting the CGI on a partially reflective mirror that also allows light to enter through the mirror thereby providing direct view of the real world. Combining a real-world view with CGI can also be accomplished by mixing video of the real world obtained from a camera with the CGI. HMD applications may include military, governmental, and civilian/commercial, and may extend to many fields, such as medicine, video gaming, and sports.

An effective head mounted display HMD affords a user a wide field of view (FOV), for example, greater than 50 degrees along a vertical axis and greater than 80 degrees along a horizontal axis provided in a compact design that allows a user to comfortably wear and use the display. Conventional displays often employ a complex assembly and positioning of several optical elements making them bulky or unsuitable for use in an HMD (e.g., by causing physical discomfort and/or being too heavy or unwieldy to wear over an extended period of time). In addition, the complexity of these designs often results in HMDs that also are expensive to manufacture.

The following description, embodiments, and examples provide an HMD affording a wide FOV while providing a compact form factor (e.g., a compact design with regard to the size, configuration, and physical arrangement of the device with respect to the user of such a device). In one example, an HMD described herein uses a single optical element (e.g., one for each eye of a user) while providing a wide FOV. As a result, a reduction in complexity of an HMD may be achieved. The reduction in complexity facilitates a compact form factor resulting in greater user comfort and a relative reduction in cost over other conventional designs. In one general aspect, an optical system is provided for a wide FOV HMD.

FIG. 1 illustrates an example of elements of an optical system. As shown in FIG. 1, in one implementation, the optical system 100 includes at least one image source 101 and an optical element 110 arranged for viewing by an eye 120 of a user. The image source 101 emits light. The optical element 110 includes a concave optical surface that reflects light. The optical surface also has an optical power, for example, specified by a prescription defining the curvature of the surface. In one implementation, the image source 101 is positioned to emit light that is outside of the FOV of the user (i.e., the user does not directly view the image source 101). The optical element 110 is positioned in relation to the image source 101 such that the concave optical surface of the optical element 110 reflects the light emitted by the image source 101. The image source 101 and the optical element 110 are further positioned at a relative angle to each other (and the approximated position of an eye of a user intended to wear the HMD), such that light from the image source is reflected by the optical surface of the optical element into a corresponding eye of a user to provide an image superimposed within the FOV of the user. In one implementation, the optical element 110 may be an optical combiner, semi-reflective surface, half-silvered mirror, and/or the like in which the optical surface of the optical element 110 may partially reflect light from the image source in addition to allowing light to pass through the optical surface from an exterior light source to combine the image light and exterior light in the FOV of the user.

In one implementation, the optical surface of the optical element 110 facing the image source 101 and eye 120 is concave. The optical surface is curved to provide a specified optical power for the optical system 100 thereby magnifying the image from the source within the user's FOV and providing a wide FOV (e.g., over a similarly angled flat surface). In one implementation, the optical surface is tilted with respect to image source 110 and viewer. However, tilting an optical power surface applies different optical power in the vertical (y dimension) and the horizontal direction (x dimension) of the viewer resulting in off-axis aberrations affecting the quality of the image perceived by the viewer of the image. In order to correct for such aberrations (e.g., an astigmatism and coma among others), that arise due to the off-axis nature of the system, while maximizing FOV, an optimized functional form of the curvature of the surface of the optical element is provided according to the embodiments and examples described in further detail below. For example, the curvature of the surface may be non-spherical. For example, the curvature of the surface may be specified according to a toroidal, biconic, or a biconic Zernike function form. Furthermore, additional correction for aberrations can be performed, for example, by positioning of the image source relative to the optical surface. In one implementation, a refractive element may be placed in relation to the optical surface of the optical element 110 to further improve an image generated by the system, as described in further detail below.

Figure 2:
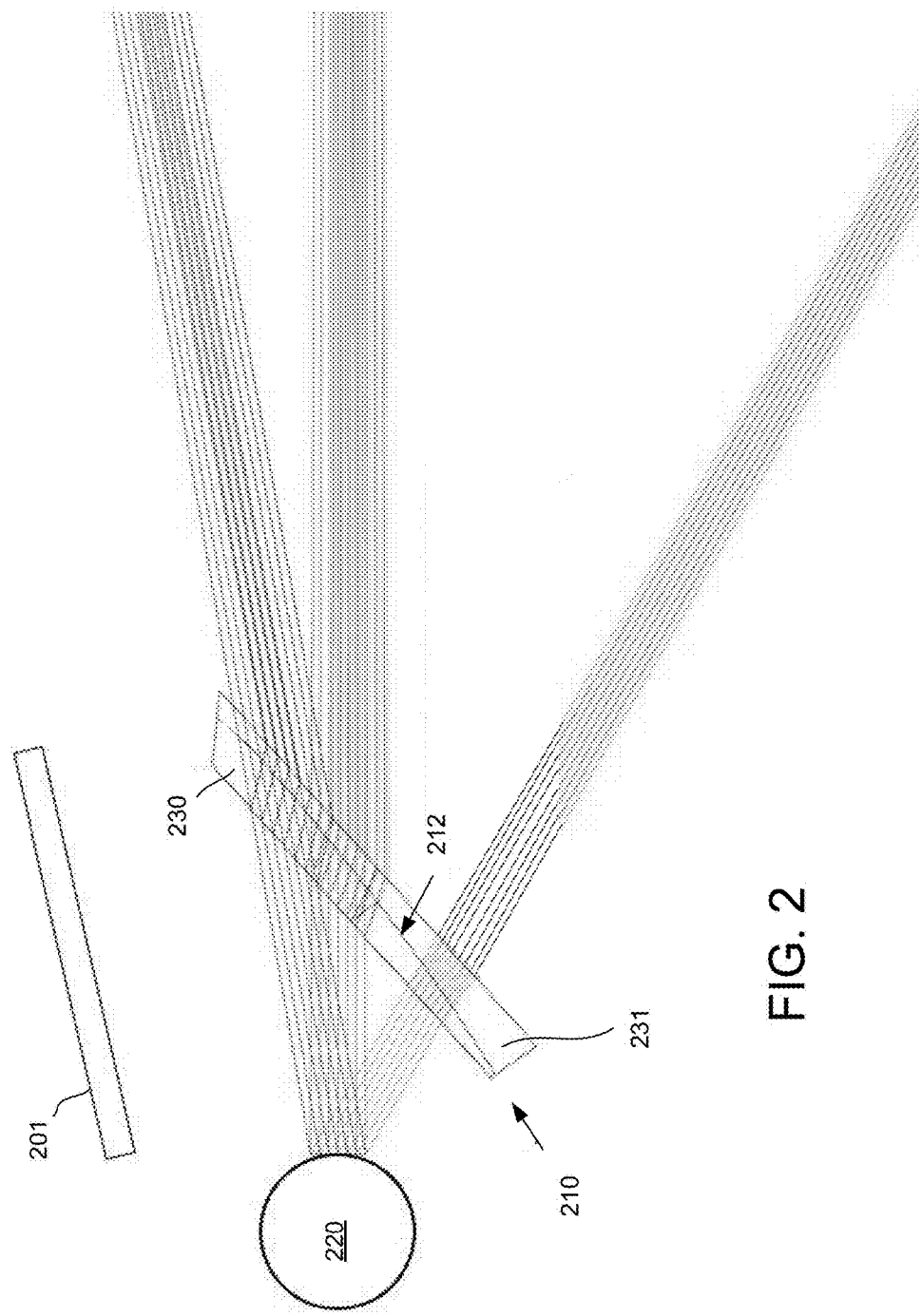
FIG. 2 illustrates an example of elements of an optical system using a toroidal functional form and having a refractive element.

FIG. 2 illustrates an example of elements of an optical system 200 using a toroidal functional form and having one or more refractive elements. As shown in FIG. 2, a view of the optical system 200 in the y-z plane is provided. The optical system 200 includes an image source 201 and an optical element 210. The image source 201 emits light directed at the optical element 210. The light is reflected by a surface 212 of the optical element towards an eye 220 of the user. As shown in FIG. 2, in one implementation the optical layout includes the image source 201 arranged above (relative to the normal orientation of viewer of the optical system) the optical element 210.

In one implementation, the optical element 210 is formed by a compound refractive layer that sandwiches the reflective surface 212. In one implementation, the compound refractive layer includes two refractive optical elements 230 and 231. The first refractive optical element 230 has an interior surface (i.e., a surface closest to the eye 220 the user) and an intermediate surface. The second refractive optical element 231 has an intermediate surface and an exterior surface (i.e., a surface furthest from the eye 220 of the user). In one implementation, the intermediate surface of the first refractive optical element 230 and the second refractive optical element 231 are curved. As shown the in the y-z plane of FIG. 2, the curve of the intermediate surface of the first refractive optical element 230 results in convex surface and the curve of the intermediate surface of the second refractive optical element 231 results in concave surface. The curves of each intermediate surfaces are complementary, such that the intermediate surfaces of the refractive optical elements 230 and 231 seamlessly mate together to form the optical element 210. In one embodiment, the interior surface of 230 and the exterior surface of 231 have the same concave curvature in order to make the entire optic effectively planar in transmission.

In one implementation, a semi-reflective coating may be deposited on either curved intermediate surface, e.g., to reflect light emitted by the image source to an eye of the user. As shown in the example of FIG. 2, the curve of the intermediate surfaces may be specified by a toroidal function form; however, the curve also may be specified by other forms, such as a biconic or biconic Zernike functional form, as described in further detail below.

As shown in FIG. 2, the refractive optical elements 230 and 231 sandwich the reflective surface 212. In this example, because the curvature of the intermediate surface of the first refractive element is the same as the intermediate surface curvature of the second refractive element, both elements may be mated together, e.g., using ultra violet (UV) bonding or a similar optical grade bonding method. In one example, the first refractive element 230 serves as a protective layer for a semi-reflective coating deposited on the intermediate surface of the second refractive element 231 aiding the long-term performance of the optical element by projecting the more fragile thin films of the coating making up the semi-reflective surface 212. In one implementation, the refractive elements 230, 231 are transparent and may be formed out of various materials such as acrylic, polycarbonate, and/or the like. Both refractive elements 230, 231 may be formed of the same material; however, the elements can differ, e.g., if a high index of refraction is desired for the inner component (e.g., to reduce the bulk of material used or the curvature that is desired). In one implementation, the bulk of the semi-reflective surface's volume may be designed to correct for distortion introduced from the front refractive surface. This design allows for transmission of the visual field, semi-reflection, and correction of aberration in an off-axis system in a single optical element effectively without alignment issues. For example, the refractive element 230 may correct for astigmatism by refracting light from the image source so as to make the RMS spot size the same length along y direction as it is along x direction; and the refractive element 231 may correct for distortion of light from the outside environment that is introduced by refractive element 230.

Figure 3:
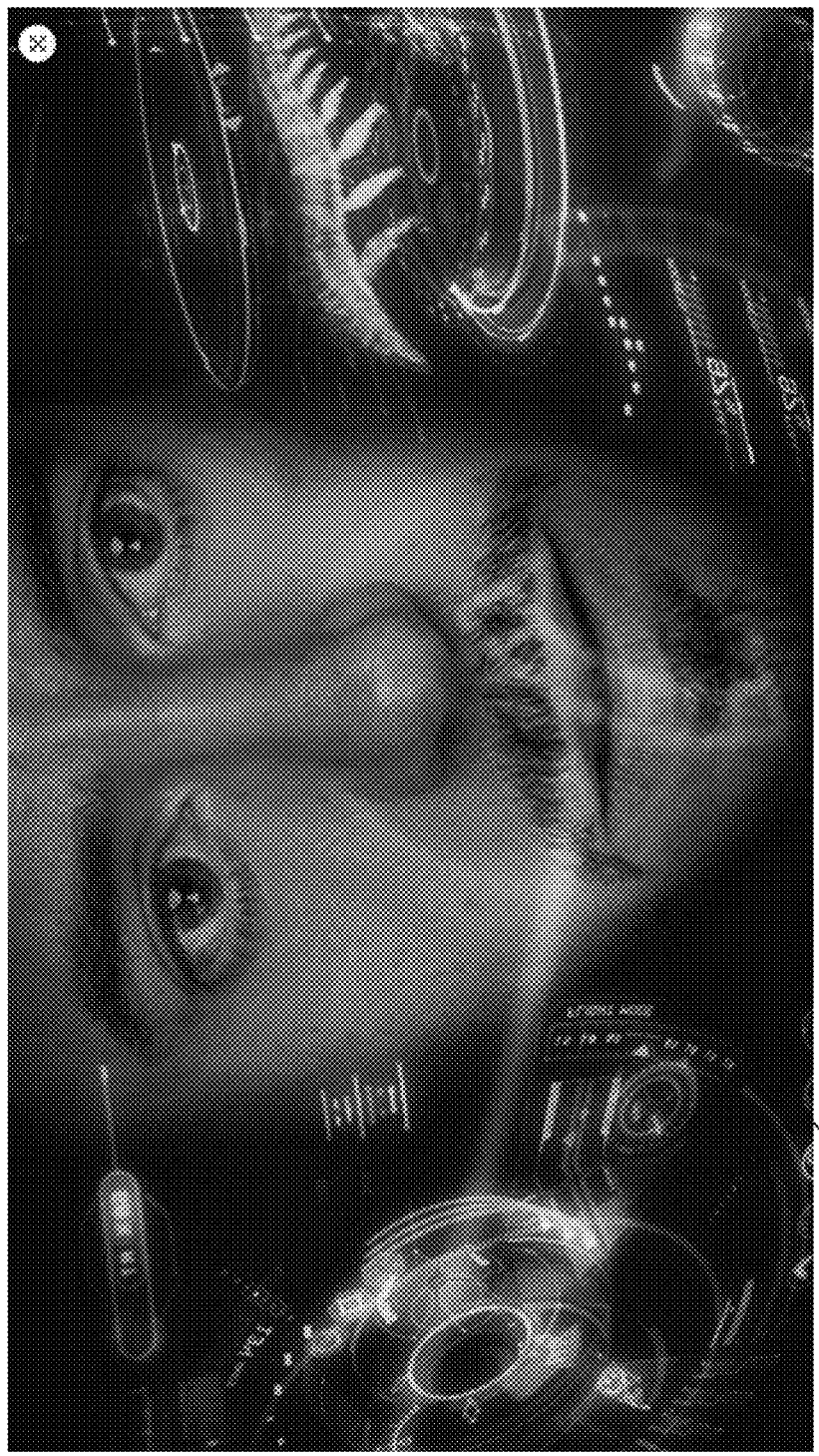
FIG. 3 shows an example of a source image for display by the optical system.

FIG. 3 shows an example of a source image 300 for an image source by the optical system. As shown in FIG. 3, a still image is shown for a scene from a movie, such as a screenshot from a display. Although a still image from a movie is shown, one will appreciate that other images may be provided by the system including a CGI, computer generated graphics (CGG), animations, interfaces, dynamic and moving images, video, among others.

Figure 4A:
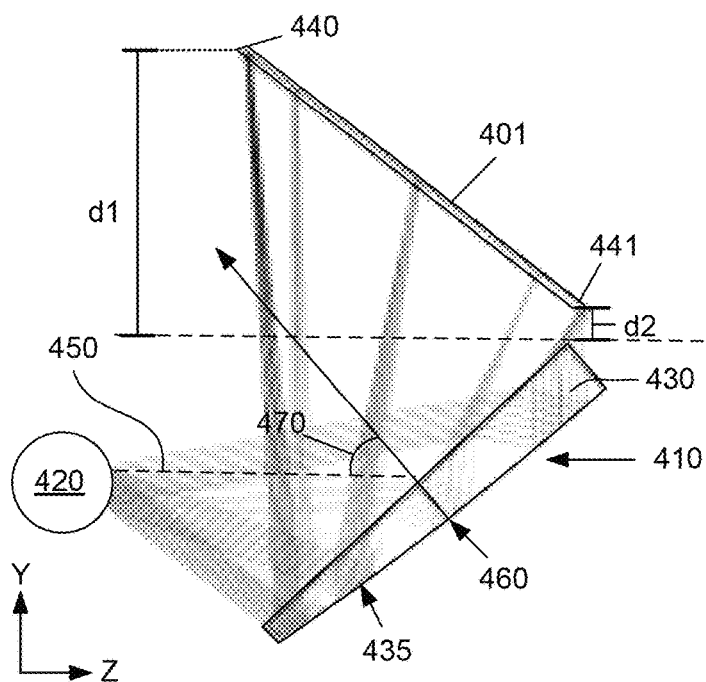
FIGS. 4A, 4B, and 4C show examples of light ray traces to illustrate positioning of the image source relative to the optical element in the optical system in one embodiment.
Figure 5A:
FIGS. 5A, 5B, and 5C show an example of images produced by arrangements of image source and optical element corresponding to FIGS. 4A, 4B, and 4C.
Figure 4B:
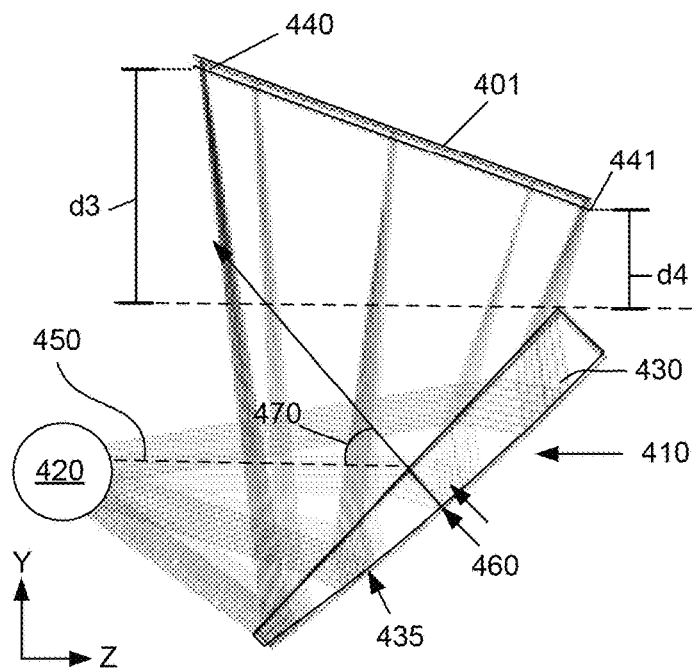
Figure 5B:
Figure 4C:
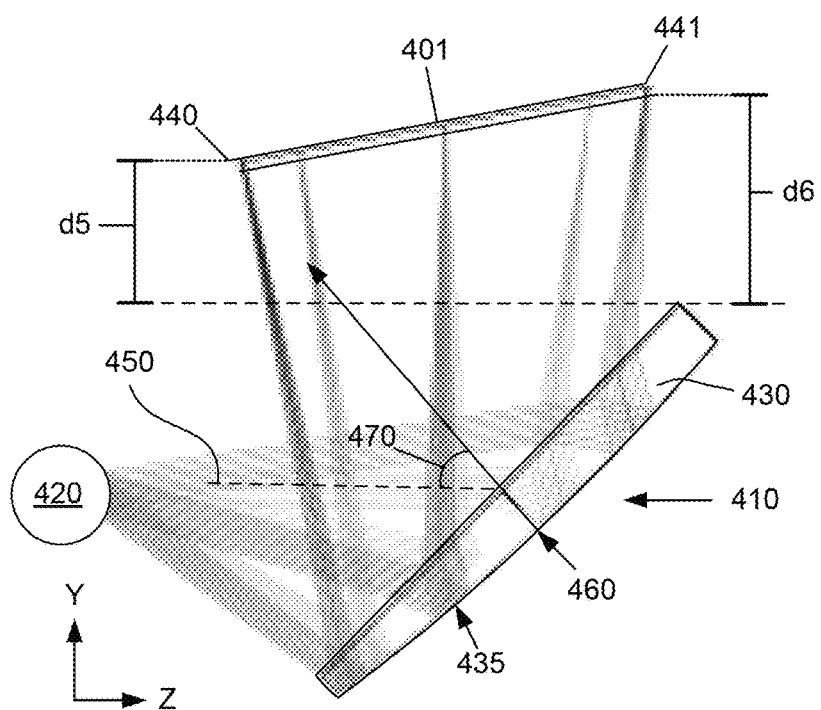
Figure 5C:

FIGS. 4A, 4B, and 4C show examples of light ray traces in the y-z plane to illustrate positioning of the image source relative to the optical element for the corresponding optical systems. FIGS. 5A, 5B, and 5C show an example of the images produced by arrangements of optical systems corresponding to FIGS. 4A, 4B, and 4C.

FIGS. 4A, 4B, and 4C each show an example of light ray trace diagrams corresponding to one of the three display positions relative to the optical element in the optical system in the y-z plane. As shown in FIGS. 4A, 4B, and 4C, optical systems 400A, 400B, and 400C may include an image source 401 and optical element 410. For example, in one implementation, the image source 401 may be implemented using a flat panel display, and the optical element 410 may be implemented using a refractive element 430 with a toroidal reflective surface 435. The image source 401 has a first edge 440 and a second edge 441. A longitudinal optical axis 450 parallel to the z-axis is shown from the center of the eye to the reflective surface. In the example, the reflective surface is concave to the viewer of the optical system. In one implementation, the vertex 460 of the base radius of the reflective surface is tilted at an acute angle 470 from the longitudinal optical axis 450.

As shown in FIG. 4A, the first edge 440 is located at a distance d1 from the longitudinal optical axis 450 and the second edge 441 is located at a distance d2 from the longitudinal optical axis 450 where d1>d2. As shown in FIG. 4B, the first edge 440 is located at a distance d3 from the longitudinal optical axis 450 and the second edge 441 is located at a distance d4 from the longitudinal optical axis, where d1>d3>d4>d2. As shown in FIG. 4C, the first edge 440 is located at a distance d5 from the longitudinal optical axis 450 and the second edge 441 is located at a distance d6 from the longitudinal optical axis 450, where d6>d5. As can be seen from the FIGS. 5A, 5B, and 5C the image quality improves (e.g., reduced distortion or the RMS spot size decreases as the distance d increases), as the distance d of the edge of the display farthest from the user to the longitudinal optical axis increases relative to the distance of the edge of the display closest to the user.

As described above, in one implementation, the reflective surface of the optical element may be shaped according to an optimized functional form and/or to provide a toroidal, biconic, or biconic Zernike surface.

In one embodiment, a toroidal function form is used to provide the shape of the reflective surface of an optical element of an HMD. For example, the toroidal form may be used to provide magnification to increase the FOV over that provided by a flat surface. In this example, the toroidal surface may include a base radius of curvature in the y-z plane, a conic constant (k), and one or more higher order polynomial aspheric coefficients. Based on this curve, the surface may be implemented by rotating this curve around an axis parallel to the y-axis of the y-z plane.

The sag of the curve of the reflective surface in the y-z plane is given, in one implementation, by Equation 1:

$$z = \frac{cy^2}{1+\sqrt{1-(1+k)c^2y^2}} + \alpha_1 y^2 + \alpha_2 y^4 + \alpha_3 y^6 + \alpha_4 y^8 + \alpha_5 y^{10} + \alpha_6 y^{12} + \alpha_7 y^{14} \quad \text{Equation (1)}$$

where c=1/R where R is the base radius in the Y-Z plane. This curve is then rotated about an axis parallel to the Y axis and intersecting the Z axis. The distance between this axis and the vertex is the radius of rotation (Rx).

In one example, all or one or more of the higher order coefficients may be set to zero to remove the higher order terms, for example, to facilitate or meet design parameters, reduce cost, or otherwise streamline manufacture of the surface. In another example, additional higher order terms may be added if desired.

Figure 6A:
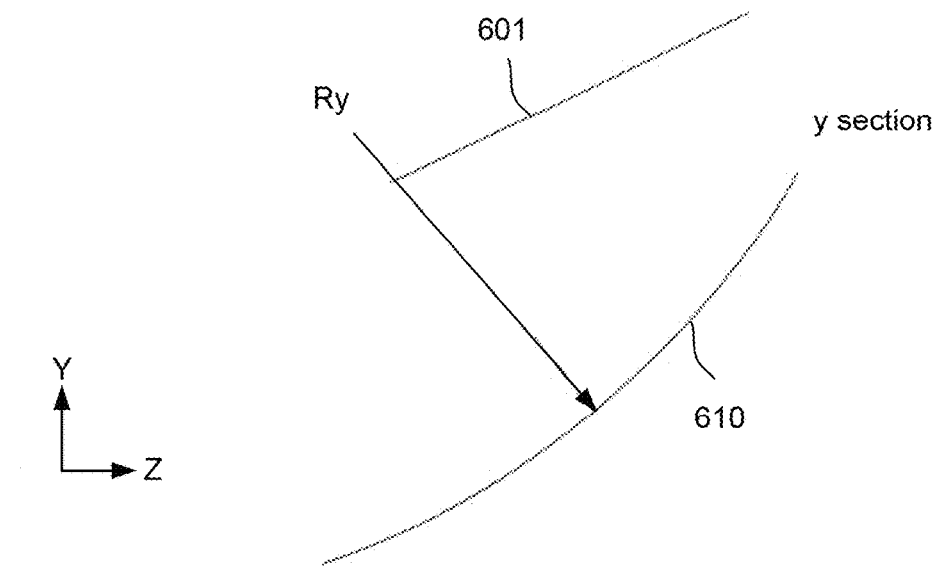
FIGS. 6A, 6B, and 6C further illustrate elements of an optical system using a biconic or biconic Zernike functional form.
Figure 6B:
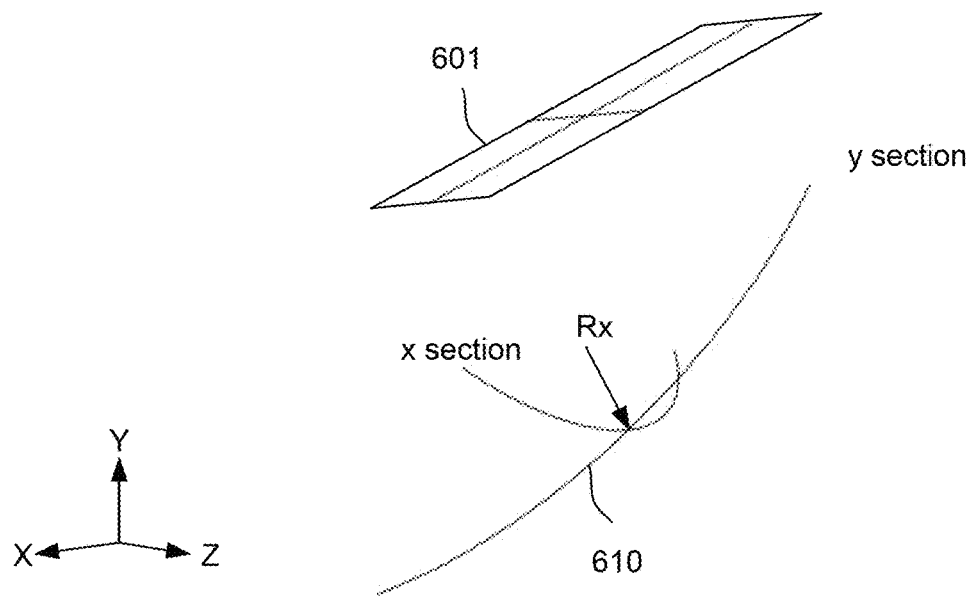
Figure 6C:
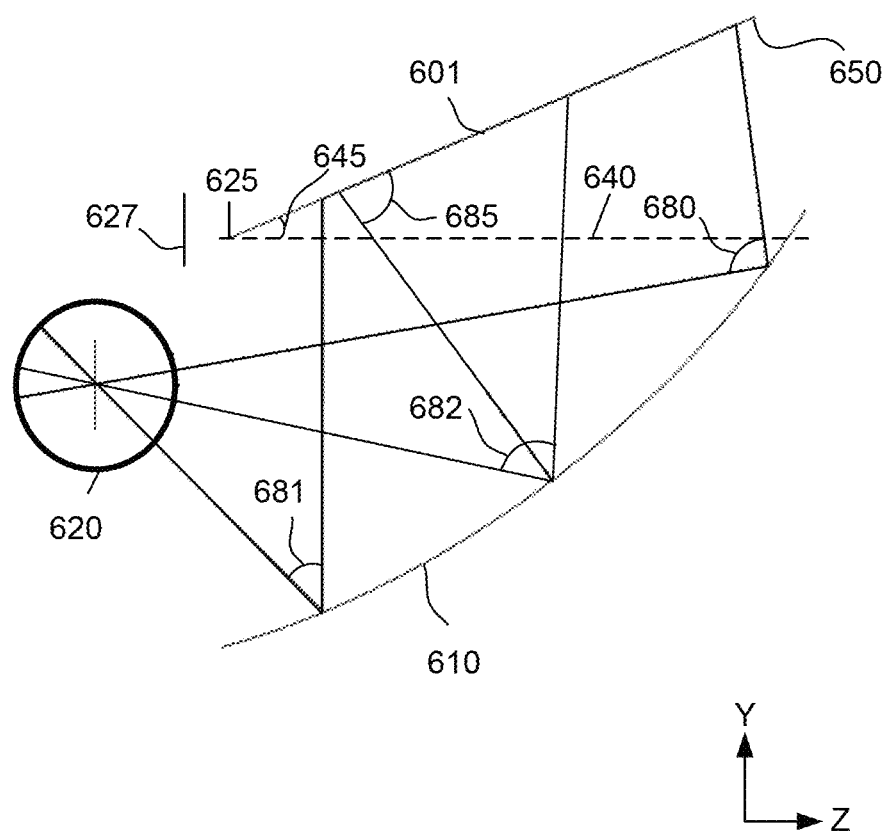

In another embodiment, a biconic functional form or a biconic Zernike functional form is used to provide the shape of the reflective surface of an optical element of an HMD. FIGS. 6A, 6B, and 6C illustrate an example of elements of an optical system using biconic or a biconic Zernike functional form to shape the reflective surface of the optical element.

As described above, aberrations such as astigmatism and coma, among others, are produced when the reflective surface having an optical power is tilted with respect to the image source. In order to reduce, minimize, eliminate such effects or otherwise provide better image quality to the user, the reflective surface of the optical element may be shaped according to a specific form function. In one example, a biconic shape is used to specify the shape of the semi-reflective surface of the optical element. Equation 2 gives the sag of a biconic surface, in one implementation, as:

$$z = \frac{c_x x^2 + c_y y^2}{1 - (1+k_x)c_x^2 x^2 - (1+k_y)c_y^2 y^2} \quad \text{Equation (2)}$$

where c=1/R where R is the base radius, cx=1/Rx where Rx is the base radius in the x dimension, cy=1/Ry where Ry is the base radius in the y dimension, kx=conic constant in the x dimension, ky=conic constant in the y dimension. The biconic surface allows the conic constant and base radius to differ in the x and y directions (i.e., Rx, Ry, kx, ky). In one implementation, this may increase the number of degrees of freedom for optimization of any particular implementation of the reflective surface.

FIG. 6A shows one example of the image source 601 and reflective surface 610 in the y-z plane. As shown in FIG. 6A, the Y section curve 615 of the reflective surface 610 is a version of the sag expressed by Equation 2 in which x=0:

$$z = \frac{c_y y^2}{1 - (1+k_y)c_y^2 y^2} \quad \text{Equation (3)}$$

where Cy=1/Ry, ky is the conic value for the y section and Ry is the base radius for the Y section curve.

FIG. 6B shows the curvature of the reflective surface in three dimensions showing the X section and Y section. The X section curve of the reflective surface 610 is a version of Equation 3 in which y=0:

$$z = \frac{c_x x^2}{1 - (1+k_x)c_x^2 x^2} \quad \text{Equation (4)}$$

where Cx=1/Rx, kx is the conic value for the X section and Rx is the base radius for the X section curve.

In another example, the reflective surface may be implemented using a biconic Zernike surface which allows for additional control by providing for the conic constant and base radius to be different in the x and y directions and for correction for Zernike polynomial deformations (such as astigmatism, coma, tip, tilt, defocus, trefoil, and spherical).

The sag of the biconic Zernike surface is given, in one implementation, by Equation 5:

$$z = \frac{c_x x^2 + c_y y^2}{1 - (1+k_x)c_x^2 x^2 - (1+k_y)c_y^2 y^2} + \sum_{i=1}^{16} \alpha_i x^i + \sum_{i=1}^{16} \beta_i y^i + \sum_{i=1}^{N} A_i Z_i(\rho, \varphi)$$ Equation (5)

where c=1/R where R is the base radius, cx=1/Rx where Rx is the base radius in the x direction, cy=1/Ry where Ry is the base radius in the y direction, kx=conic constant in the x direction, ky=conic constant in the y direction, αi=coefficients for x terms, βi=coefficients for y terms, Zi=ith Zernike Standard Polynomial, ρ=normalized radial ray coordinate, φ=angular ray coordinate, and Ai=coefficient for ith Zernike Standard Polynomial.

The higher order terms can be used to further minimize root mean square (RMS) spot size, and improve image quality near the edges of the user's FOV.

FIG. 6C shows a relation between the image source 601 and the reflective surface 610 in the y-z plane in one implementation. In this example, the image source 601 is positioned in a similar orientation to that shown, for example, in FIG. 4C in order to improve the quality of the image. The image source 601 is positioned outside the field of view of the user. In other words, the eye 620 of a user does not directly view the image source 601. For example, in one implementation, a base edge 625 of the image source 601 may be placed in close proximity to the forehead 627 of a typical user. For example, a physical housing and hardware (e.g., as shown in FIGS. 9-12) can position the base edge 625 of the image source, such as a display, in proximity to the forehead (e.g., 10-15 mm). The image source is then tilted "up" from the base 625 relative to a longitudinal axis 640 parallel to the z-axis intersecting the base edge 625 of the image source 601. For example, in one implementation, the angle 645 of tilt may be 15-30 degrees. Therefore, the height along the y-axis of the far edge 650 of the image source 601 furthest from the viewer as measured from the longitudinal axis may, in one implementation, be greater than the height of the base edge 625 of the image source closest to the forehead of the viewer.

In addition, to provide a wide FOV while maximizing image quality, the curvature of the reflective surface and the tilt with respect to the image source are selected, such that the angle of reflection to the user's eye (the "angle of reflection") decreases along the curve in the y section. For example, the angle of reflection of light emitted from an image source 601 at the edge 650 may, in one implementation, be approximately double the angle of reflection from the edge 625 of the image source closest to the user. In one example, the maximum angle of reflection is less than 100 degrees and the minimum angle of reflection is greater than 40 degrees. For example, as shown in FIG. 6C, the angle of reflection 680 formed by light emitted from the edge 650 (i.e., the edge furthest from the viewer) is approximately 93 degrees, the angle of reflection 681 formed by light emitted from the edge 625 (i.e., the edge closest to the viewer) is approximately 45 degrees, and the angle of reflection 682 formed by light emitted from display reflected at the vertex of the curve is 83 degrees. In addition, in one implementation, the angle 685 formed by the axis of the base radius at the vertex and the axis formed by the length of the display may be selected to be between 81 and 71 degrees. For example, the angle 685 shown in FIG. 6C is approximately 76 degrees.

Figure 7:
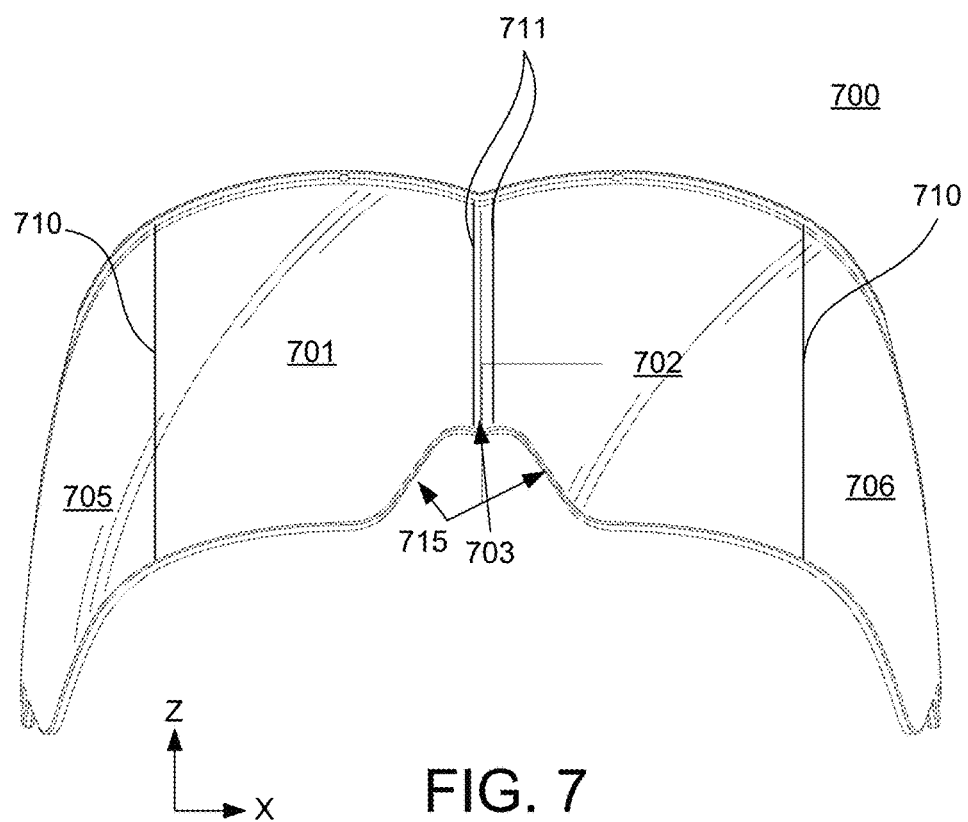
FIG. 7 shows one example of an implementation for an optical element of the optical system.

FIG. 7 shows one example of an implementation for an optical element of the optical system for an HMD. A shown in FIG. 7, two optical elements may be positioned using a wearable visor 700 in one embodiment. The visor can be made from a variety of materials, including, but not limited to, acrylic, polycarbonate, PMMA, plastic, glass, and/or the like and can be thermoformed, single diamond turned, injection molded, and/or the like to position the optical elements relative to the image source and eyes of the user and facilitate attachment to the housing of the HMD.

Figure 10:
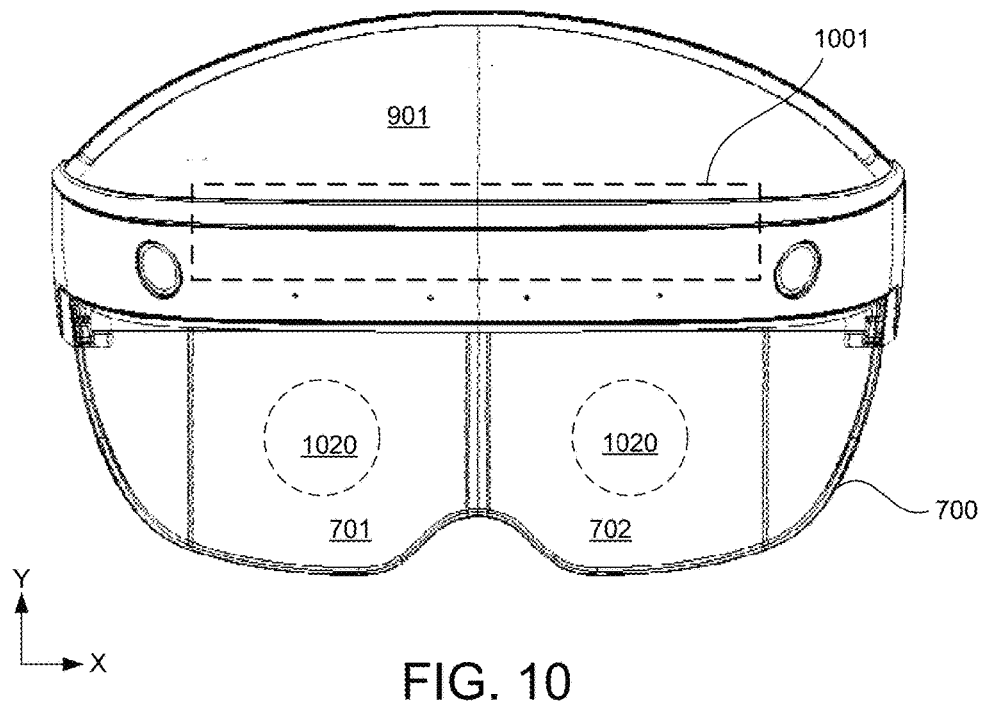
FIG. 10 show a front view of the HMD shown in FIG. 9.

In one implementation, the visor 700 may include two optical elements, for example, image regions 701, 702 or clear apertures. In this example, the visor 700 also includes a nasal or bridge region 703, and a two temporal regions 705 and 706. Each image region is aligned with one eye of a user (e.g., as shown in FIG. 10) to reflect an image provided from the image source to the eye of a user of the HMD. A bridge or nasal region 703 is provided between the two image regions 701 and 702 to connect the two regions 701 and 702. The image regions 701 and 702 mirror each other through the y-z plane that bisects the nasal rejoin 703. In one implementation, a temporal region 705 or 706 extends from an outer edge 710 of the image region wrapping around the eyes to the temple housing of the HMD to provide for peripheral vision and offer support of the optical elements such that the image regions 701 and 702 do not require support from a nose of a user wearing the HMD.

The eye image regions 701 and 702 include an optical element as described above. For example, in one implementation, the eye image region may include a concave inner surface (i.e., the surface facing the eye of a user) having a toroidal, biconic, or biconic Zernike curvature (e.g., as specified by one of Equations 1-5 or variations thereof). The curvature may be characterized by a specific optical prescription used to turn the inner surface of the image area. In one example, distance $d_w$ between the outer edge 710 (e.g., the edge closer to the temple) in the y-z plane and the inner edge 711 (e.g., the edge closer to the nasal region) in the y-z plane are equidistant. In one example, this dimension is approximately 70 mm.

In one implementation, the bridge or nasal region 703 and portions 715 of the eye image regions may be shaped to provide a rounded or cutout portion where a user's nose would otherwise contact the visor. As a result, the visor does not touch the face of a typical user when the HMD is worn.

The visor 700 places the optical elements of the eye image region at the desired tilt or angle relative to the user's eyes and an image source, such as a display provided by the HMD, as described further with reference to FIGS. 9-12.

Figure 8A:
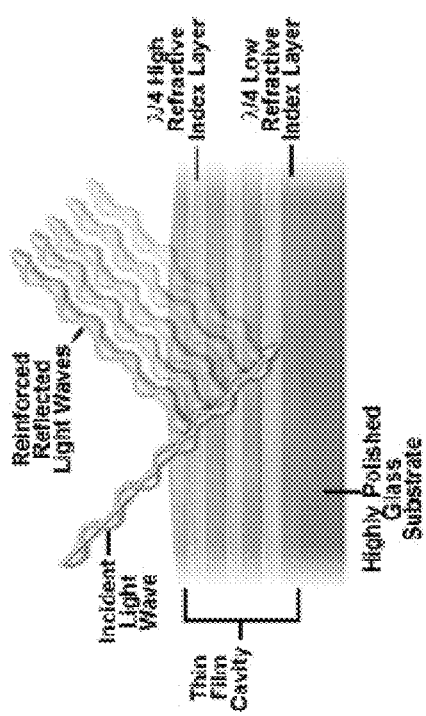
FIGS. 8A and 8B illustrate an example of optical coating design elements for the optical element.
Figure 8B:
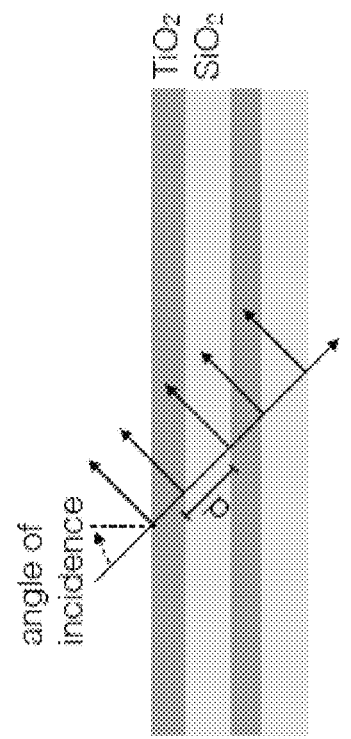

In one example, the eye image region 701, 702 has a semi-reflective (SR) coating formed on the inner concave surface facing the eye of the user. The SR coating is chosen to reflect 40%+/−5% of the light projected from a display over the visible spectrum over the eye image area or clear aperture. Some implementations of the SR coating may operate on the principle of Bragg reflection, where high and low index material thin-films are alternated to create layers of partially reflective mirrors, for example, as shown in FIGS. 8A and 8B. The thicknesses of these layers are constructed such that the optical path length (OPL) (OPL=n×d; where n=index of refraction and d=distance the light transverses) are equal, and are quarter wave plates (i.e., wavelength/4). When taken in conjunction with a 180° phase shift that occurs when going from a high to a low index material, this configuration gives rise to constructive interference. Partially reflected light coming from all layers is then in-phase. In one example, coatings with TiO2 (n=2.61) and SiO2 (n=1.45) may be used.

The visor 700 may be formed, for example, by injection molding using polycarbonate in a single or multi-cavity mold. The cavity of the mold defines the convex side or outer side of the visor facing away from the user. In one implementation, the convex side may be machined, e.g., using computerized numerical control. The optical prescription specifying the inner concave surface of the optical elements of the eye image region may be fine-tuned, such as by diamond turning the surfaces of these inserts. Polycarbonate is injected in the space between the cavity and the diamond turned inserts, the piece is allowed to cool, and the piece is released.

In one implementation, the injection molded parts may then be coated, such as by using an electron beam evaporator vacuum chamber. In one example, the concave portion of the visor forming the eye image region is coated using a dielectric coat that is 40% reflective from 400 nm-700 nm wavelengths, for example as described above for the semi-reflective coating. The convex portion is coated with an antireflective coating that is optimized for a particular angle of incidence (AOI), e.g., 32 deg. (R<1%) where R is the reflectivity. In one implementation, the dielectric coating serves as the primary reflective surface of the eye image area; the antireflective coating minimizes or eliminates any doublet ghost image observed from a reflection off of the inside polycarbonate/air boundary. In one implementation, the visor 700 may be hard dip coated with polysiloxane to protect the surface and film. In one implementation, a visor 700 may receive a hydrophobic and vacuum coat to protect the surface from fingerprints and other similar marks.

Figure 9:
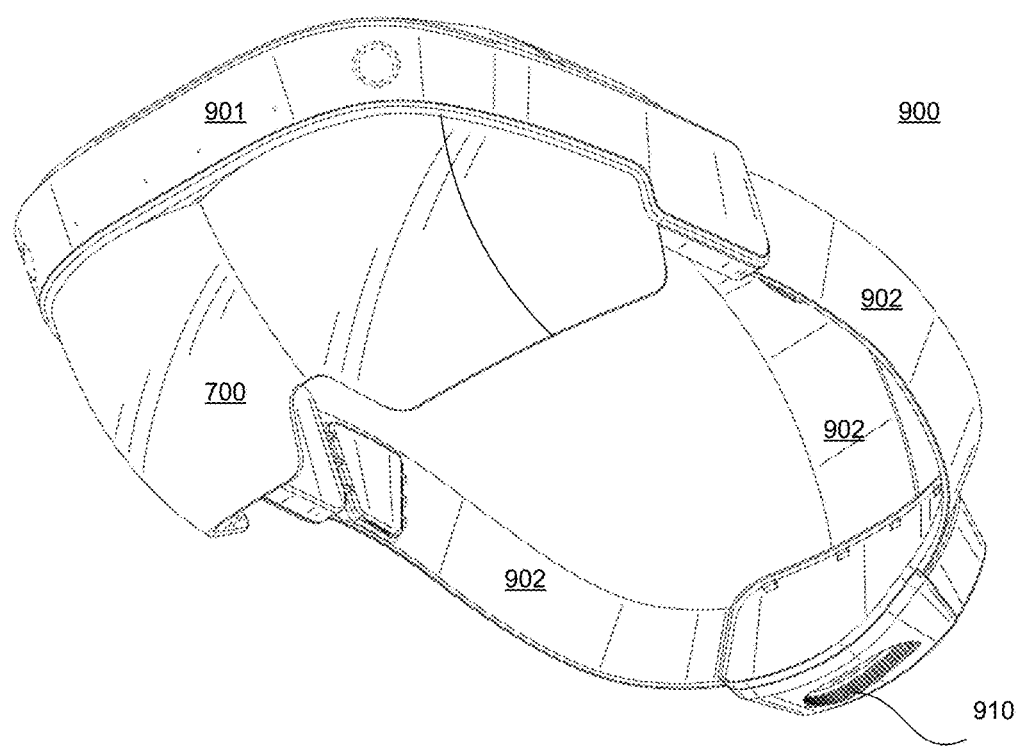
FIG. 9 shows a perspective view of one example of an HMD.

FIG. 9 shows a perspective view of one example of an HMD 900. As shown the HMD includes a visor 700 attached to a housing 901, straps 902, and a mechanical adjuster 910 used to adjust the position and fit of the HMD to provide comfort and optimal viewing by a user of the HMD 900. In one implementation, the housing may include a molded section to roughly conform to the forehead of a typical user and/or may be custom-fitted for a specific user or group of users. The housing may include various electrical components of the system, such as a display, a processor, a power source, a memory, and various inputs and controls and their related connections.

Figure 11:
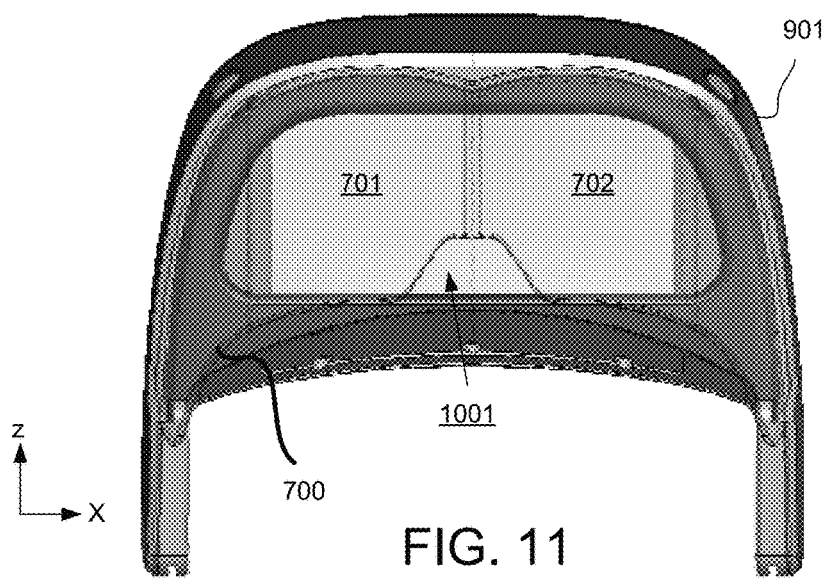
FIG. 11 shows a bottom view of the HMD shown in FIG. 9.

As shown in FIGS. 10 and 11, the housing helps position the visor 700 relative to the image source 1001 and the user's eyes 1020. In one example, the image source 1001 may be implemented using one or more displays. For example, the image source may be a single display. If an optical element is provided for each eye 1020 of a user, the display may be partitioned into at least two halves. For example, each half may display an image intended for a separate eye 1020. In another example, two displays may be provided. In this example, each display is paired with a corresponding optical element or image area, where each pair provides an image to an eye of the user. Examples of displays include a liquid crystal display (LCD), a Light Emitting Diode (LED) display, a flexible organic LED (OLED) display, and a Liquid Crystal on Silicon (LCoS or LCOS). In one example, a single 4.5- to 5.2-inch diagonal Liquid Crystal Display (LCD) may be used. In another example, dual 2.8-3.4-inch diagonal LCDs, one for each eye, may be used.

In one implementation, the display may be part of a mobile phone or other mobile device that is separate from, but placed within and/or affixed to, the HMD and/or HMD housing and is subsequently detachable or removable therefrom. For example, a user-accessible opening may be provided to accept and position a mobile phone or other mobile device with a display to provide an image source for the HMD. In this example, a hatch or a slot is configured to accept the mobile phone or other mobile device and provide access to a guide, a rail, one or more walls, or a shelf to position the display of the mobile device or mobile phone outside the field of view and at the geometries according to the descriptions and examples provided herein. In yet another example, an opening may provide one or more fasteners, such as a clip or deformable member that accept and detachably lock and position the display of the mobile device or mobile phone outside the field of view and at the geometries according to the descriptions and examples provided herein. As can be seen from the various drawings, the footprint of the display in the x-z plane and the y-z plane roughly corresponds to or is contained within the footprint of the eye image areas in the in the x-z plane and the y-z plane.

Figure 12:
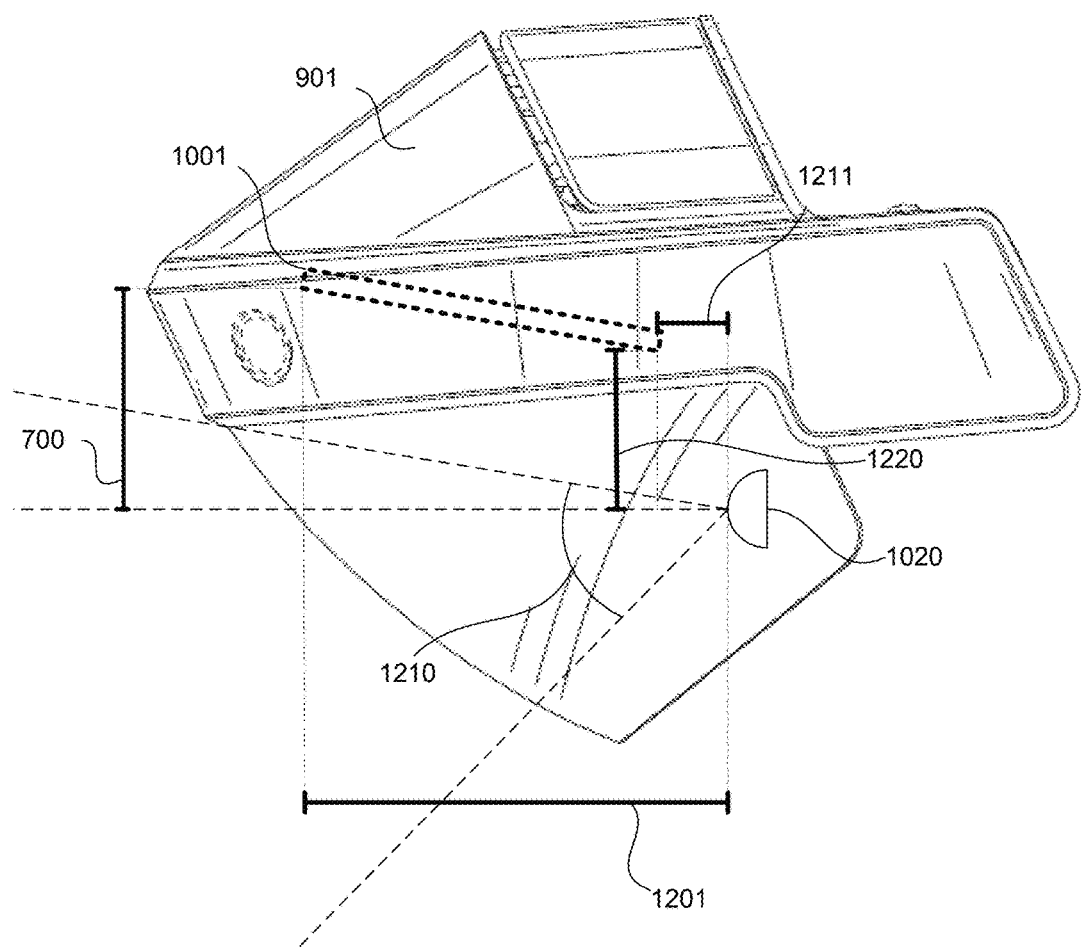
FIG. 12 shows a side view of the HMD shown in FIG. 9 illustrating examples of various dimensions of the HMD.

FIG. 12 shows a side view of the HMD shown in FIG. 9 illustrating examples of various dimensions of the HMD. For example, the semi-reflective surface at the horizontal is positioned at a distance 1201 of approximately 82 mm from the eye 1020 of a user in one implementation. In this example, the FOV per eye is approximately 60 degrees vertically 1210 and horizontally (not shown) providing a 30 degree overlap in the middle (e.g., providing for 3D imaging in the overlapping region). The entire horizontal FOV is approximately 75 degrees (not shown). In one implementation, the edge of the display closest to the user is positioned at a distance 1211 of approximately 23 mm from the eye of the user in the horizontal plane and the edge farthest from the user is positioned at a distance 1201 approximately 82 mm from the eye of the user in the horizontal plane. In one implementation, the edge of the display closest to the user is positioned at a distance 1220 of 25 mm from the horizontal plane, and the edge farthest from the user is positioned at a distance 1222 of 50 mm from the eye of the user in the horizontal plane. It will be appreciated that these dimensions are relative and constitute one example of the orientations that may be used.

Figure 13A:
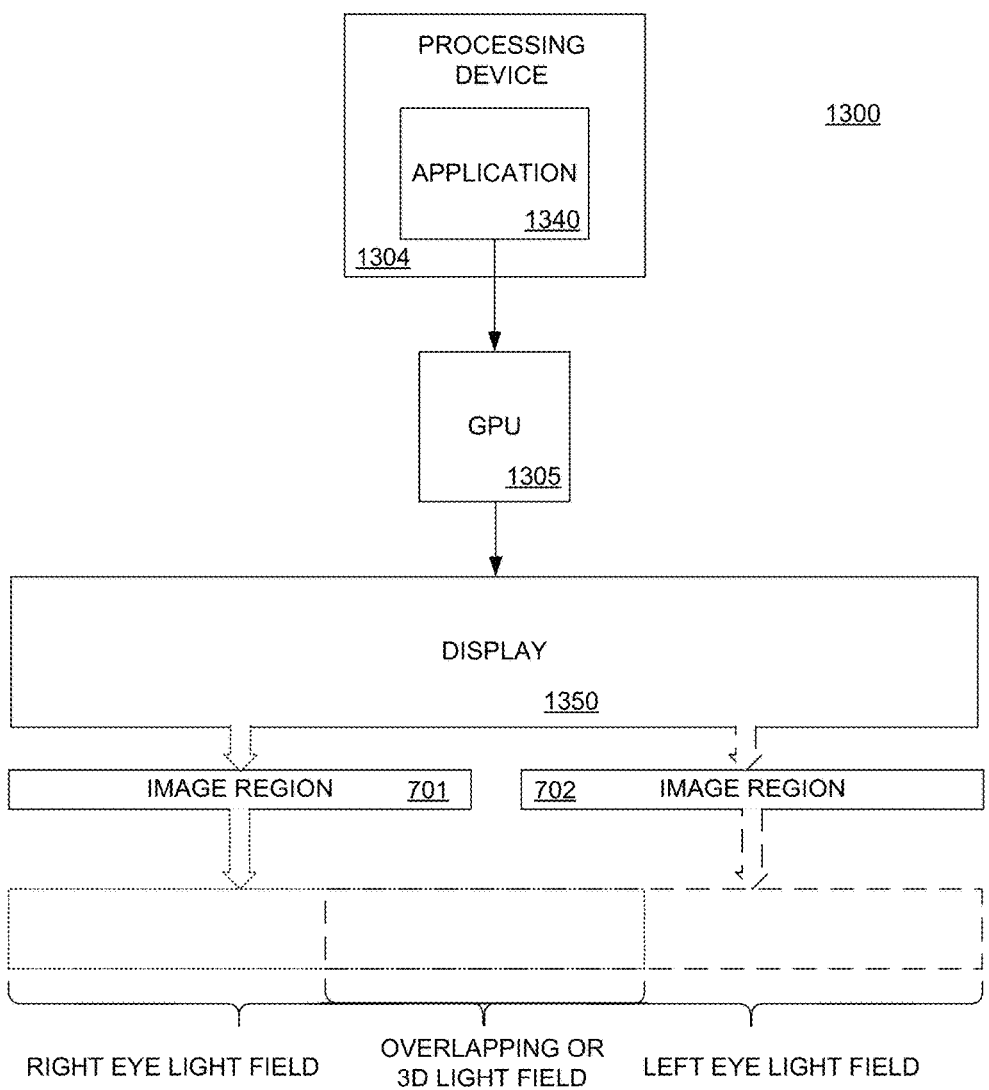
FIGS. 13A and B show some examples of components of the HMD.
Figure 13B:
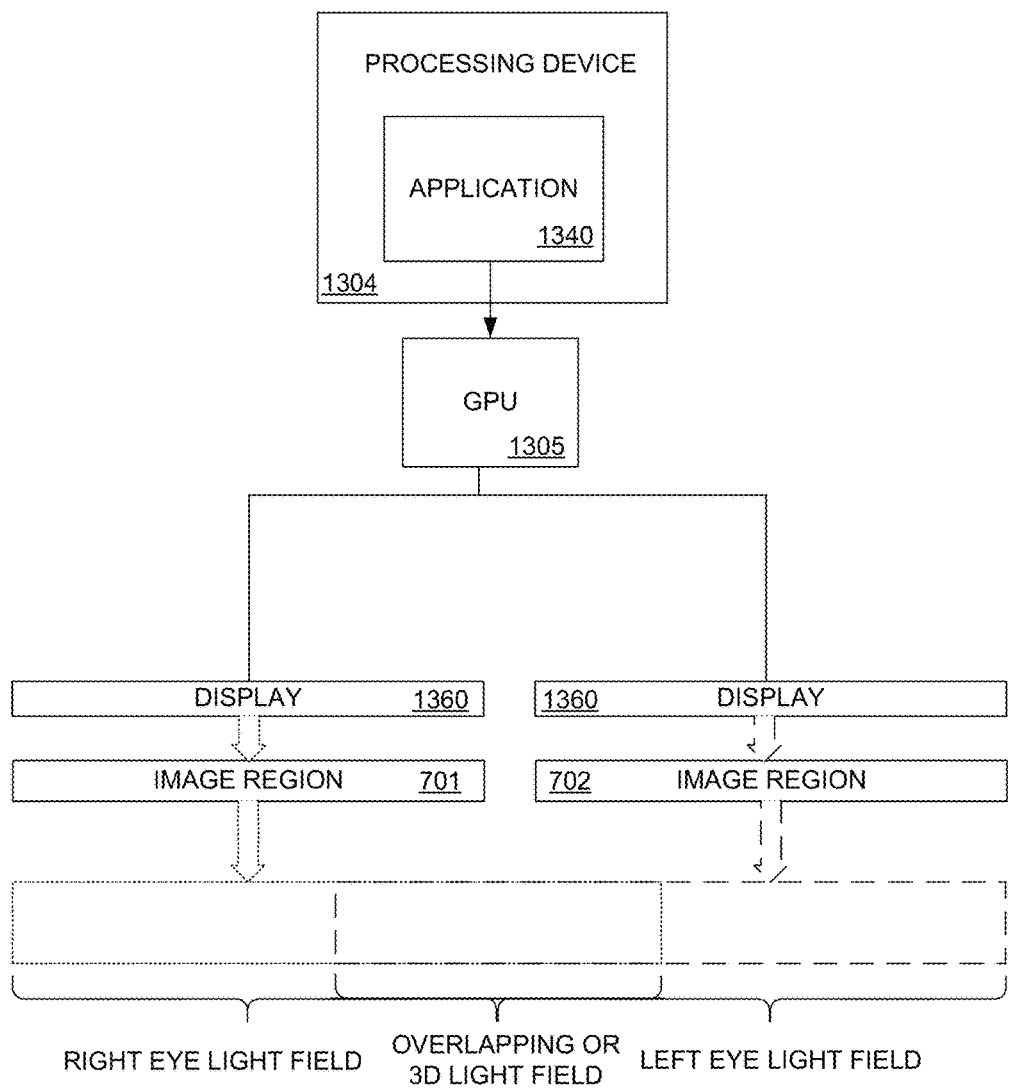

FIGS. 13A and 13B show some examples of electrical components of the HMD. In one implementation, each system may include a processing device 1304 and a graphics processing unit (GPU) 1305.

The processing device 1304 may implement one or more applications or programs. In one example, the processing device 1304 includes an associated memory (not shown) storing one or more applications 1340 implemented by the processing device 1304 that generates digital image data depicting one or more of graphics, a scene, a graphical user interface, a computer game, a movie, content from the Internet, such as web content accessed from the World Wide Web, among others, that are to be presented to a viewer of the wearable HMD. Examples of applications includes media players, mobile applications, browsers, video games, and graphic user interfaces, to name but a few.

The HMD also may include a GPU 1105. The GPU 1105 may be one or more of a standalone graphics processor, an integrated graphics processor, or a combination thereof configured to control one or more displays to present an image to the user of the HMD. For example, the GPU 1305 receives an image from the application 1340 and processes the image for output to a display.

As shown in FIG. 13A, the processing device 1304 and GPU 1305 control a single display 1350 divided into two halves. Each half of the display 1350 corresponds to one of the two image regions 701, 702 of the visor 700 of the HMD 900. The processing device 1304 and GPU 1305 control an image provided by the display. In one example, the same image and/or different perspectives of the same image may be displayed by each of the halves of the display. The image provided by the display is reflected by the image regions to the eyes of the user to provide a projected synthetic image in the FOV of the user including a right eye light field, a left eye field, include a portion in which the right and left fields overlap providing, for example, a 3-D image. In one implementation, the display may be part of a mobile phone or other mobile device having its own CPU and/or GPU, where the device is placed within and/or affixed to, the HMD and/or HMD housing.

As shown in FIG. 13B, the implementation is very similar to that described above for the single input display shown in FIG. 13A; however, separate displays 1360 are provided for each eye image region 701, 702 of the visor 700.

In one implementation, the pre-warping of the left and right eye images and the spacing of these images on these displays may be optimized during calibration of the system according to the interpupilary distance (IPD). However, that the size of the image regions (e.g., 701, 702) provided by the visor of the HMD as described herein minimizes the need of any tuning at all. For example, the system was may be designed according to an average IPD (e.g., 63 mm); however, the design provided herein is fairly tolerant to different IPDs (e.g., over 95% of the population). As a result, users with different IPDs are able to see and fuse the images presented by the HMD.

As described above, the techniques described herein for a wearable AR system can be implemented using digital electronic circuitry, or in computer hardware, firmware, software, or in combinations of them in conjunction with various combiner imager optics. The techniques can be implemented as a computer program product, i.e., a computer program tangibly embodied in a non-transitory information carrier, for example, in a machine-readable storage device, in machine-readable storage medium, in a computer-readable storage device or, in computer-readable storage medium for execution by, or to control the operation of, data processing apparatus or processing device, for example, a programmable processor, a computer, or multiple computers. A computer program can be written in any form of programming language, including compiled or interpreted languages, and it can be deployed in any form, including as a stand-alone program or as a module, component, subroutine, or other unit suitable for use in the specific computing environment. A computer program can be deployed to be executed by one component or multiple components of the vision system.

The exemplary processes and others can be performed by one or more programmable processing devices or processors executing one or more computer programs to perform the functions of the techniques described above by operating on input digital data and generating a corresponding output. Method steps and techniques also can be implemented as, special purpose logic circuitry, e.g., an FPGA (field programmable gate array) or an ASIC (application-specific integrated circuit).

Processing devices or processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. The processing devices described herein may include one or more processors and/or cores. Generally, a processing device will also include, or be operatively coupled to receive data from or transfer data to, or both, one or more mass storage devices for storing data, such as, magnetic, magneto-optical disks, or optical disks. Non-transitory information carriers suitable for embodying computer program instructions and data include all forms of non-volatile memory, including by way of example semiconductor memory devices, such as, EPROM, EEPROM, and flash memory or solid state memory devices; magnetic disks, such as, internal hard disks or removable disks; magneto-optical disks; and CD-ROM and DVD-ROM disks. The processor and the memory can be supplemented by, or incorporated in special purpose logic circuitry.

The HMD may include various other components including various optical devices and frames or other structure for positioning or mounting the display system on a user allowing a user to wear the vision system while providing a comfortable viewing experience for a user. The HMD may include one or more additional components, such as, for example, one or more power devices or connections to power devices to power various system components, one or more controllers/drivers for operating system components, one or more output devices (such as a speaker), one or more sensors for providing the system with information used to provide an augmented reality to the user of the system, one or more interfaces from communication with external output devices, one or more interfaces for communication with an external memory devices or processors, and one or more communications interfaces configured to send and receive data over various communications paths. In addition, one or more internal communication links or busses may be provided in order to connect the various components and allow reception, transmission, manipulation and storage of data and programs.

In order to address various issues and advance the art, the entirety of this application (including the Cover Page, Title, Headings, Field, Background, Summary, Brief Description of the Drawings, Detailed Description, Claims, Abstract, Figures, Appendices and/or otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

The invention claimed is:

1. A head mounted display (HMD) configured to be worn by a user comprising:
   an image source positioned outside the direct field of view of the user, the image source including:
      a planar display surface having a base edge and a far edge, the planar display surface having a first orientation where the planar display surface:

1) is arranged orthogonal to a first reference plane formed by a vertical dimension and a longitudinal dimension extending from an eye of the user; and
2) forms an acute angle with a second reference plane at the intersection of the second reference plane and the base edge, the second reference plane formed by a horizontal dimension and the longitudinal dimension; and an optical component corresponding to the eye of the user including:
a concave surface having a reflective or partially reflective optical coating that covers a portion of the concave surface, the concave surface having a second orientation where an optical axis of the concave surface in the first reference plane is not parallel to the longitudinal dimension; and
a housing assembly that arranges the image source relative to the optical component in the first and second orientations where:
1) the distance of the far edge from the vertical dimension is greater than the distance of the base edge from the vertical dimension; and
2) the distance of the far edge from the longitudinal dimension is greater than the distance of the base edge from the longitudinal dimension,
wherein light emitted from the display surface is directly reflected by the reflective or partially reflective optical coating of the concave surface to the eye of the user without any intervening optical elements between the display surface and the optical component, the light presenting an image within the field of view of the user of the HMD.

2. The HMD of claim 1 wherein the curvature of the concave surface specifies an optical power.

3. The HMD of claim 1 wherein the curvature of the concave surface is non-spherical.

4. The HMD of claim 1 wherein the curvature of the concave surface has one of a biconic functional form, where a conic constant and a base radius differ in the horizontal and vertical dimensions, or a biconic Zernike functional form, where a conic constant and a base radius differ in the horizontal and vertical dimensions while correcting for Zernike polynomial deformations.

5. The HMD of claim 1 wherein the curvature of the concave surface is toroidal.

6. The HMD of the claim 1 wherein the acute angle formed at the intersection of the second reference plane and the base edge is between 15 and 30 degrees.

7. The HMD of claim 1, wherein the housing assembly is configured to position the base edge in proximity to the forehead of the user when the HMD is worn by the user and the image source is one of a liquid crystal display (LCD), a Light Emitting Diode (LED) display, a flexible organic LED display, and a Liquid Crystal on Silicon display.

8. The HMD of claim 1 wherein the maximum angle of reflection of light from the far edge of the display surface reflected by the concave surface is approximately double the minimum angle of reflection of light reflected from the base edge of the display surface by the surface.

9. The HMD of claim 1 wherein the maximum angle of reflection of light reflected from the far edge of the display surface to the eye of the user by the concave surface is less than 100 degrees and the minimum angle of reflection of light reflected to the eye of the user from the base edge of the display surface by the concave surface is greater than 40 degrees.

10. The HMD of claim 1 wherein the reflective or partially reflective coating is a series of thin films.

11. The HMD of claim 1 wherein the image source is a display of a mobile device or mobile phone detachably affixed to the HMD.

12. The HMD of claim 1 wherein the housing assembly includes an opening having dimensions allowing the user in to insert the image source, the housing assembly configured to hold and position the image source and its display surface in the first orientation when inserted through the opening.

13. A head mounted display (HMD) configured to be worn by a user comprising:
an image source positioned outside the direct field of view of the user, the image source including:
a planar display surface having a base edge and a far edge, the planar display surface having a first orientation where the planar display surface:
1) is arranged orthogonal to a vertical reference plane formed by a vertical dimension and a longitudinal dimension extending from either eye of the user; and
2) forms an acute angle with a second reference plane at the intersection of the second reference plane and the base edge, the second reference plane formed by a horizontal dimension and the longitudinal dimension; and
two optical components, one corresponding to each eye of the user, each optical component including:
a concave surface having a reflective or partially reflective optical coating that covers a portion of the concave surface, the concave surface having a second orientation where an optical axis of the concave surface in the first reference plane of the corresponding eye is not parallel to the longitudinal dimension; and
a housing assembly that arranges the image source relative to the optical components in the first and second orientations where:
1) the distance of the far edge from the vertical dimension is greater than the distance of the base edge from the vertical dimension; and
2) the distance of the far edge from the longitudinal dimension is greater than the distance of the base edge from the longitudinal dimension,
wherein light emitted from the display surface is directly reflected by the reflective or partially reflective optical coating of the concave surface of each optical component to the corresponding eye of the user without any intervening optical elements between the display surface and each optical component, the light presenting an image within the field of view of the user of the HMD.

14. The HMD of claim 13 wherein the curvature of each concave surface has one of a biconic functional form, where a conic constant and a base radius differ in the horizontal and vertical dimensions, or a biconic Zernike functional form, where a conic constant and a base radius differ in the horizontal and vertical dimensions while correcting for Zernike polynomial deformations.

15. The HMD of the claim 13 wherein the acute angle formed at the intersection of the second reference plane and the base edge is between 15 and 30 degrees.

16. The HMD of claim 13 wherein the curvature of each concave surface is toroidal.

17. The HMD of claim 13 further comprising a transparent, monolithic visor coupled to the housing assembly, the visor including:

two image regions, each image region including one of the two optical components, each image region having an inner and outer side;

a bridge region formed between the inner sides of the two image regions; and two temporal regions, each temporal region extending from an outer side of a respective image region and configured to wrap around a respective temple of the user.

18. The HMD of claim 13, wherein the housing assembly is configured to position the base edge in proximity to the forehead of the user when the HMD is worn by the user, and the image source is one of a liquid crystal display (LCD), a Light Emitting Diode (LED) display, a flexible organic LED display, and a Liquid Crystal on Silicon display.

19. The HMD of claim 13 wherein the maximum angle of reflection of light reflected from the far edge of the display surface to the eye of the user by each corresponding concave surface is less than 100 degrees and the minimum angle of reflection of light reflected to the eye of the user from the base edge of the display surface by each corresponding concave surface is greater than 40 degrees.

20. The HMD of claim 13 wherein the image source is a display of a mobile device or mobile phone detachably affixed to the HMD.

21. The HMD of claim 13 wherein the housing assembly includes an opening having dimensions allowing the user in to insert the image source, the housing assembly configured to hold and position the image source and its display surface in the first orientation when inserted through the opening.

22. A head mounted display (HMD) configured to be worn by a user comprising:

two image sources, one corresponding to each eye of the user, positioned outside the direct field of view of the user, each image source including:

a planar display surface having a base edge and a far edge, the planar display surface having a first orientation where the planar display surface:

1) is arranged orthogonal to a vertical reference plane formed by a vertical dimension and a longitudinal dimension extending from a corresponding eye of the user; and 2) forms an acute angle with a second reference plane at the intersection of the second reference plane and the base edge, the second reference plane formed by a horizontal dimension and the longitudinal dimension; and two optical components, one corresponding to each eye of the user, each optical component including:

a concave surface having a reflective or partially reflective optical coating that covers a portion of the concave surface, the concave surface having a second orientation where an optical axis of the concave surface in the first reference plane of the corresponding eye is not parallel to the longitudinal dimension; and a housing assembly that arranges each image source relative to a corresponding one of the optical components in the first and second orientations where:

1) the distance of the far edge of each display surface from the vertical dimension is greater than the distance of the base edge of each display surface from the vertical dimension; and 2) the distance of the far edge of each display surface from the longitudinal dimension is greater than the distance of the base edge of each display surface from the longitudinal dimension, wherein light emitted from each display surface is directly reflected by the reflective or partially reflective optical coating of a corresponding concave surface to the corresponding eye of the user without any intervening optical elements between each display surface and the corresponding optical component, the light presenting an image within the field of view of the user of the HMD.

23. The HMD of claim 22 wherein the curvature of each concave surface has one of a biconic functional form, where a conic constant and a base radius differ in the horizontal and vertical dimensions, or a biconic Zernike functional form, where a conic constant and a base radius differ in the horizontal and vertical dimensions while correcting for Zernike polynomial deformations.

24. The HMD of the claim 22 wherein the acute angle formed at the intersection of the second reference plane and the base edge is between 15 and 30 degrees.

25. The HMD of claim 22 wherein the curvature of each concave surface is toroidal.

26. The HMD of claim 22 further comprising a transparent, monolithic visor coupled to the housing assembly, the visor including:

two image regions, each image region including one of the two optical components, each image region having an inner and outer side;

a bridge region formed between the inner sides of the two image regions; and two temporal regions, each temporal region extending from an outer side of a respective image region and configured to wrap around a respective temple of the user.

27. The HMD of claim 22, wherein the housing assembly is configured to position the base edge of each image source in proximity to the forehead of the user when the HMD is worn by the user, and the two image sources are one of a liquid crystal display (LCD), a Light Emitting Diode (LED) display, a flexible organic LED display, and a Liquid Crystal on Silicon display.

28. The HMD of claim 22 wherein the maximum angle of reflection of light reflected from the far edge of each display surface to the eye of the user by the corresponding concave surface is less than 100 degrees and the minimum angle of reflection of light reflected to the eye of the user from the base edge of each display surface by the corresponding concave surface is greater than 40 degrees.

* * * * *